United States Patent [19]
Churchill

[11] Patent Number: 5,000,535
[45] Date of Patent: Mar. 19, 1991

[54] FIBER OPTICS LIGHT BAR

[76] Inventor: David L. Churchill, 1217 Carmella La., Sarasota, Fla. 34243

[21] Appl. No.: 442,514

[22] Filed: Nov. 28, 1989

[51] Int. Cl.[5] .......................... G02B 6/26; G02B 6/32; F21V 7/04
[52] U.S. Cl. .............................. 350/96.20; 350/96.22; 350/96.24; 350/96.18; 362/32
[58] Field of Search ............... 350/96.15, 96.16, 96.18, 350/96.20, 96.22, 96.24, 96.25, 320; 362/32; 156/294, 295, 296, 304.2, 304.5

[56] References Cited

U.S. PATENT DOCUMENTS

| | | | |
|---|---|---|---|
| 3,360,640 | 12/1967 | Seitz et al. | 362/32 X |
| 3,437,803 | 4/1969 | Seitz et al. | 362/32 X |
| 3,446,952 | 5/1969 | Sitter et al. | 362/32 X |
| 3,532,873 | 10/1970 | Batson et al. | 362/32 X |
| 4,061,522 | 12/1977 | Bauerkemper | 156/305 |
| 4,407,012 | 9/1983 | Desmaret | 362/32 |
| 4,613,926 | 9/1986 | Heitman et al. | 362/32 |
| 4,726,642 | 2/1988 | Mori | 350/96.15 |
| 4,729,069 | 3/1988 | Von Kohorn et al. | 362/32 |
| 4,729,070 | 3/1988 | Chiu | 362/32 X |
| 4,887,190 | 12/1989 | Sadamune et al. | 362/32 |

Primary Examiner—Brian Healy
Attorney, Agent, or Firm—Charles J. Prescott; Raymond H. Quist

[57] ABSTRACT

An elongated metal channel having a U-shaped cross-section has a cover and end caps secured thereto forming a housing. Along one wall of the housing are drilled longitudinally spaced holes. In some of the holes (which may have different orientations) are fixed metal collars having secured therein one end of a bundle of optical fibers. The fiber ends are secured by an adhesive which has been cured, after which the ends are polished. The fiber bundles are led through the housing to an opening (which may be in the cover) where a flexible sleeve has one end mounted. The fibers are threaded through the flexible sleeve and secured in a tip at the other end of the sleeve. The fibers in the tip are secured therein by an epoxy and polished. In some cases the metal collars with the fiber bundle are positioned at the end of a gooseneck with a lens mounted adjacent to the tip. The method by which the fibers are mounted in the collars is described.

10 Claims, 1 Drawing Sheet

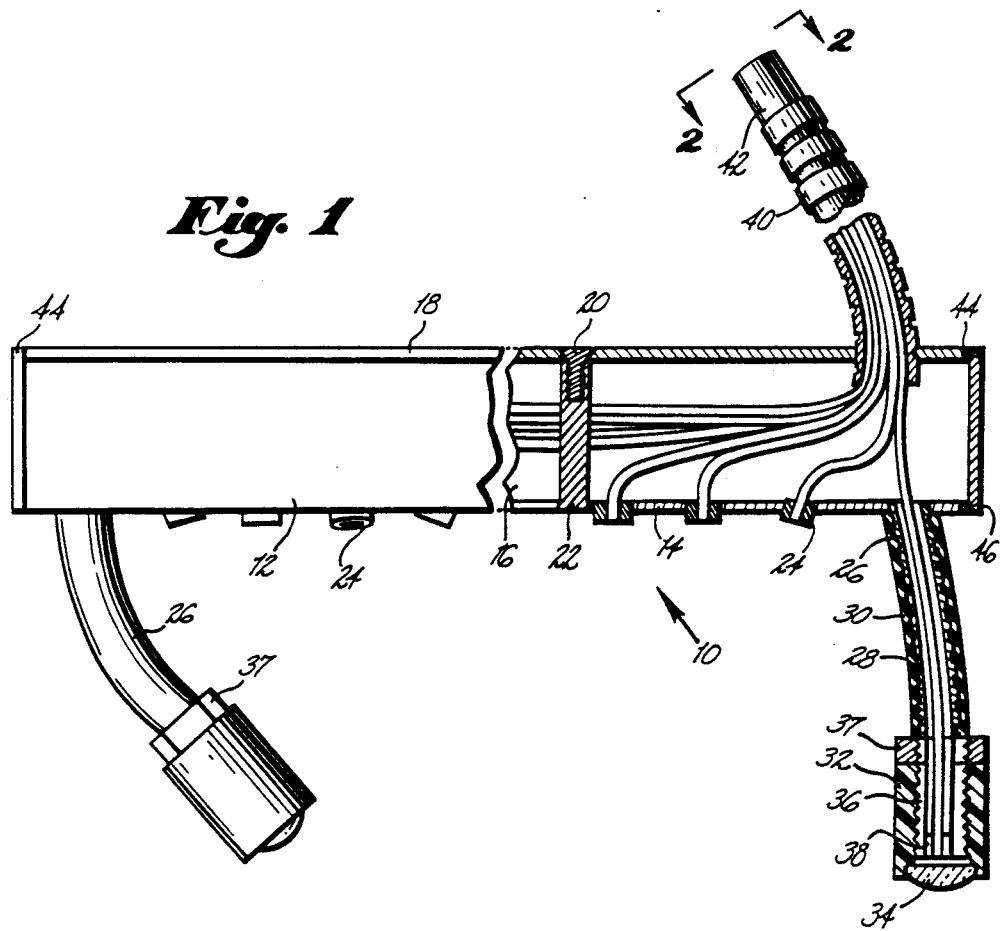

FIBER OPTICS LIGHT BAR

BACKGROUND OF THE INVENTION

1. Field of the Invention

This invention relates generally to an illuminating system providing multiple beams of light using one end of a bundle of optical fibers for each beam, while exposing the other ends of the bundles to a high intensity light source. More particularly, an elongated hollow housing has a plurality of longitudinally spaced openings in each of which the end of a optical fiber bundle is fixed.

2. Description of Related Art

U.S. Pat. No. 3,638,008, Keller et al., entitled: "Multiple Light Transmission from a Single Light Source", discloses a mounting structure which is connected to a light bulb reflector in which multiple optical fibers are mounted.

U.S. Pat. No. 3,790,249, Treace, entitled: "Illuminating Means for Operating Microscope", discloses the use of light carried by a fiber optic light guide to provide the illumination for a microscope.

U.S. Pat. No. 4,613,926, Heitman et al., entitled: "Fiber Optic Illuminating Assembly", discloses fiber optic bundles having one end adjacent to a light and the individual fiber other ends cut at various lengths to provide a plurality of point light sources.

U.S. Pat. No. 4,729,070, Chiu, entitled: "Adjustable Ring Light", discloses a circular housing having circumferentially spaced beams of light which converge. The beams may be emitted by ends of bundles of optical fibers and the point of convergency is movable along an axis.

Although all the foregoing patents disclose various fiber optics arrangements, none of them disclose a light bar structure for providing longitudinally spaced light beams which is readily modified to provide any desired number of such beams. Such a light bar is particularly useful in illuminating display cases so that separate items can be spotlighted and for decorative effects.

SUMMARY OF THE INVENTION

An elongated housing is formed using a channel member having a U-shaped cross-section. Through the base of the channel member are drilled a plurality of longitudinally spaced holes having the same diameter. These holes may be drilled orthogonally to the base or at other angles. Bundles of optical fibers—typically having 1800 or more fibers in each bundle—have one end fixedly mounted in a short sleeve or collar. This collar is secured in one of the drilled holes, or alternatively, is secured at the end of a longer, flexible sleeve extending from a drilled hole. The portion of the fiber bundles which will fit, is layed in the channel, with the remainder threaded through a sleeve attached at the end of the channel or on the cover adjacent to the end of the channel. The ends of the fibers are then epoxied into a collar, cut and polished. The cover and ends of the channel are attached so that the fragile fibers are protected from breakage. The polished fiber ends contained in the collar are illuminated by a high intensity light source which is not part of this invention. The resulting light bar is readily mounted to illuminate a display case, for example.

It is therefore an object of this invention to provide a fiber optics light bar which provides longitudinally spaced beams of light.

It is also an object of this invention to provide a light bar in which one or more beams of light can be aimed as desired.

In accordance with these and other objects, which will become apparent hereafter, the instant invention will now be described with reference to the accompanying drawings.

BRIEF DESCRIPTION OF THE DRAWINGS

FIG. 1 is a front elevation, partially in cross-section, of a fiber optics light bar in accordance with the invention.

FIG. 2 is a cross section showing the sleeve and tip along lines 2—2.

DETAILED DESCRIPTION OF THE INVENTION

Referring to FIG. 1, light bar 10 is formed from an elongated channel member having a U-shaped cross-section so as to have front wall 12, bottom wall 14 and back wall 16. Cover 18 fits across the open top of the channel and is held in place by screws, such as screw 20, or other convenient fasteners. Collar 22, having internal threads to receive screw 20, has a smooth outer surface so that the optical fibers placed in channel 10 will not be damaged.

Through bottom wall 14, a plurality of longitudinally spaced holes are drilled. These holes may be drilled orthogonally through bottom 14, or at various angles if desired. In some or all of these holes collars 24 are secured. Collars 24, which may be stainless steel, have a plurality of optical fiber ends therein. These fibers are a bundle which has been threaded through collars 24, coated with methacrylic adhesive and cured with ultraviolet light. The excess fiber protruding from collars 24 is cut off, and the tips are then ground and polished in three steps. The first step uses a 320 mesh grit moistened with a solution of water and Cimstar 40. The second step uses 600 mesh grit dry. The final step employs a Pelham pad with alumina oxide moistened with Cimstar 40.

Collars 24 are secured in the drilled holes with an epoxy such as Hysol 608. In lieu of, or in addition to, collars 24, goosenecks 26 may be connected to bottom wall 14 so that light beams can be aimed as desired. Goosenecks 26 have a flexible metal sleeve 28 and may have a black rubber covering 30 if desired. At the end of goosenecks 26 is internally threaded housing 32 having lens 34 mounted therein. Housing 32 has externally threaded brass sleeve 36 secured therein. Nut 37 keeps housing 32 in position. Secured in brass sleeve 36 is collar 38 which may be the same type as collars 24. As with collars 24, collar 38 has a fiber bundle end which is secured and polished.

In cover 18, sleeve 40 which may be flexible aluminum or silicone rubber tubing has one end secured using an epoxy such as Epotech 353. The other ends of the fiber bundles are threaded through sleeve 40 to tip 42 (shown in FIG. 2) and secured using epoxy such as Epotech 353. This epoxy is cured using a heat gun as it hardens at 353 degrees Fahrenheit. The excess fiber is cut off and the tip is polished as described above.

End caps 44 are secured in place using fasteners, such as spring pins 46, which cannot be removed.

Tip 42 is designed to be plugged into a light source having a high intensity halogen lamp therein. Such light sources are not a part of this invention. U.S. Pat. No. 3,790,249 shows a light source of this type.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A fiber optics light bar for providing multiple beams of light from a single light source comprising:
   an elongated hollow housing having a cover, a bottom wall, and side walls;
   a first plurality of spaced openings through said bottom wall of said housing;
   each of said first plurality of spaced openings having one end of an optical fiber bundle fixedly secured therein;
   each of said optical fiber bundles having a second end;
   a flexible conduit having one end secured to said housing;
   each of said optical fiber bundles extending from one of said first plurality of spaced openings, through said elongated hollow housing and said flexible conduit;
   said flexible conduit having a second end in which said second ends of said optical fiber bundles are secured;
   said hollow housing having ends; and
   end caps secured to said elongated hollowing housing at each said end thereof.

2. A fiber optics light bar in accordance with claim 1 wherein:
   said end caps are secured with fasteners which cannot be removed.

3. A fiber optics light bar in accordance with claim 1 wherein:
   at least one additional opening through said one wall of said housing;
   a sleeve extending from said additional opening having one end secured is said additional opening and a second end;
   said second end movable to a desired orientation;
   an optical fiber bundle having one end secured at said second end of said sleeve;
   said optical fiber bundle having a second end secured at said second end of said flexible conduit.

4. A fiber optics light bar in accordance with claim 3 further including:
   a lens mounted adjacent to said one end of said optical fiber bundle having one end secured at said second end of said sleeve.

5. A fiber optics light bar for providing multiple beams of light from a single light source comprising:
   an elongated hollow housing having ends, a cover, a bottom wall, and side walls;
   end caps secured to said elongated hollow housing at each of said ends;
   a first a plurality of spaced openings through one wall of said housing;
   at least some of said plurality of spaced openings having different orientations than others;
   each of said first pluraltiy of spaced openings having one end of an optical fiber bundle fixedly secured therein;
   each of said optical fiber bundles having a second end;
   a flexible conduit having one end secured to said housing;
   each of said optical fiber bundles extending from one of said first plurality of spaced openings, through said elongated hollow housing and said flexible conduit;
   said flexible conduit having a second end in which said second ends of said optical fiber bundles are secured;
   said ends of said optical fiber bundles being polished.

6. A fiber optics light bar in accordance with claim 5 wherein: said flexible conduit is secured to said cover.

7. A fiber optics light bar in accordance with claim 5 wherein: said flexible conduit is formed of metal.

8. A fiber optics light bar in accordance with claim 5 wherein: said flexible conduit is formed of rubber.

9. A fiber optics light bar in accordance with claim 5 wherein: said one end of each of said optical fiber bundles is secured in a metal collar.

10. A fiber optics light bar in accordance with claim 9 wherein: said metal collar is formed of stainless steel.

* * * * *